United States Patent Office 3,259,591
Patented July 5, 1966

3,259,591
POLYMERIC BORON-CONTAINING EPOXY RESINS
James W. Shepherd, Gibsonia, Pa., assignor to Callery Chemical Company, Pittsburgh, Pa., a corporation of Pennsylvania
No Drawing. Filed Apr. 14, 1961, Ser. No. 102,919
4 Claims. (Cl. 260—2)

This invention relates to new epoxy resin compositions containing boron and having improved physical properties.

Epoxy resins are the newest and most promising of the major industrial plastics. They are thermosetting materials which, when treated with a curing agent, become hard, cross-linked systems having particularly desirable properties. Their versatility, good handling characteriestics, toughness and inertness makes them applicable to many uses to which plastics have heretofore been unusable.

Conventional epoxy resins are made by the polymerization of the diglycidyl ether of bisphenol A (p,p'-dihydroxyphenyldimethyl methane) or similar compounds. The polymers are produced from such compounds by the addition of a chemically reactive agent known as a curing agent. Epoxy resin curing agents, as that term is used in the art and as it is used in this specification and claims, refers to those substances which are known to transform epoxy resins to the hard thermo-set solid state; such curing agents are sometimes also called hardeners, activators or catalysts. The way in which various epoxy resin curing agents effect the cure varies; some cure by catalytic action, but others take part in the reaction. Similarly, the conditions required for the cure vary with the curing agent and the resin, with some curing agents acting at room temperature whereas others may require application of external heat, while still others act by utilizing the heat produced by an exothermic reaction during the cure. Various types of epoxy resin curing agents are known and are conventionally used, including amines and their adducts, organic acids, acid anhydrides, amides, boroxines and the like.

The epoxy resin polymers produced by the known methods and by polymerization of the known epoxy resins are normally hard and brittle. Thus, while, as mentioned above, such resins have many very desirable properties, their brittleness makes them less useful for some applications where because of exposure to physical shock, they sometimes tend to crack and otherwise become damaged.

I have now discovered that a new type of polymeric epoxy resin is produced by the polymerization of epoxy esters of certain boron acids. The polymeric epoxy resins thus produced retain the desirable properties of the known conventional epoxy resin polymers, but in addition, my new polymers have slightly elastic qualities which make them more resilient and less brittle than those epoxy resin polymers known heretofore, without sacrificing any of the toughness for which such polymers are noted. The new polymers of my invention are produced by the polymerization of epoxy esters of boron acids of the type described below, using conventional epoxy resin curing agents of all types. They are unique in that they contain boron atoms in the polymeric structure.

The esters of boron acids which can be used to produce my new polymers are of the general formula

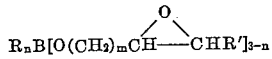

where R is an alkyl, aryl, alkaryl, arylalkyl, cycloalkyl, alkenyl, di-(epoxyalkoxy)boryl alkyl, or di-(epoxyalkoxy)boryl phenyl radical, R' is hydrogen, alkyl or epoxyalkyl, $n$ is a number from 0 to 1 and $m$ is a number from 1 to 10. Included within the scope of the above formula, when $n$ is 1, are esters of boronic acids corresponding to the formula

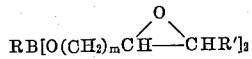

where R' is alkyl or epoxyalkyl, as well as esters in which R' is hydrogen, in which case the formula becomes

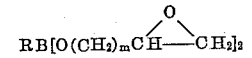

Such esters of boronic acids are called boronates.

Esters of orthoboric acid are also within the scope of my invention, as indicated in the above general formula where $n$ is 0, and have the formulas

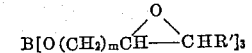

where R' is alkyl or epoxyalkyl

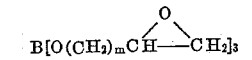

where R' is hydrogen. These esters of orthoboric acid are usually known as borates, although they are sometimes called orthoborates.

A method of producing these epoxy esters of boronic acids and orthoboric acid by reacting an epoxy alcohol with the acid is disclosed in my copending patent application, Serial No. 102,918, filed on the same date. For example, the appropriate acid and epoxy alcohol in benzene may be refluxed and the water formed during esterification removed by azeotropic distillation of the benzene-water azeotrope. After completion of the reaction removal of the remaining benzene leaves the desired epoxy ester.

For convenience and clarity, the invention is discussed and exemplified herein in connection with various individual compounds of the above types. However, it should be recognized that mixtures of such compounds can be used to produce polymers in the manner described and that such mixtures and the polymeric epoxy resins produced therefrom are included within the scope of my invention as claimed in this application. Such mixtures may comprise both borates and boronates, as well as various borates or boronates, within the scope of the above formulas.

The above esters of boron acids produce improved polymeric epoxy resins when polymerized by treatment with any of the conventionally used epoxy resin curing agents, such as amines and their adducts, organic acids, carboxylic acid anhydrides, amides, boroxines and others. Thus, such curing agents as diethylene triamine, triethylene tetramine, boron trifluoride etherate, potassium hydroxide, trimethoxyboroxine, diethylamine, benzyl trimethylammonium hydroxide and dimethylaminopropylamine are among those used as the curing agents to produce polymeric resins from boron acid epoxy esters. The conditions, such as temperature, used to produce the new polymers of my invention are ordinarily the same as are conventionally used to cure other epoxy resins with the particular curing agent employed.

The amount of curing agent used depends upon the type of curing agent as well as the nature of the epoxy ester treated. The basis for determining the amount of curing agent to be used with any particular system is the same when using my epoxy esters as when using the commonly used epoxy resins, such as diglycidyl ethers of bisphenol A and similar compounds. When the curing agent is of the catalytic type, an empirical determination of the optimum amount of catalyst to be used should be made for each system. Using catalytic curing agents, such as tertiary amines, the amount is not particularly critical and the general approach is to use that amount of curing agent which provides a convenient rate of reaction. It has been found that in the case of catalytic type agents, the amount used can be varied as much as 50% without seriously affecting the properties of the product achieved. For example, from five to fifteen parts of catalyst per one hundred parts of resin are commonly used in the case of tertiary amines. If less than the required amount of catalytic curing agent is used, the reaction rate is lessened and higher temperatures are required to achieve a completely cured resin.

With other types of curing agents, ratios which provide about one active hydrogen in the curing agent for each epoxy group in the resin are generally used with conventional resins and are also desirable in curing the epoxy esters of this invention. Thus, with cross-linking amines having at least two amino hydrogen, for example, each hydrogen on the nitrogen of the curing agent is sufficient to cure one equivalent weight of epoxy ester. Similar considerations apply with the use of other non-catalytic curing agents, such as acids and acid anhydrides.

Some specific typical examples of the invention, illustrating the method of producing polymeric epoxy resins from epoxy esters of boron acids, are described below.

*Example I.—Polymerization of di-(9,10-epoxystearyl) n-butylboronate*

3020 parts by weight of di-(9,10-epoxystearyl)n-butylboronate was mixed with 425 parts of trimethoxyboroxine. After four hours at room temperature (about 20 to 30° C.), the mixture was gelled. At the end of twelve hours, with no external heating, it had become tough, resilient and slightly rubbery. The infra-red spectra of this material and that of the starting ester were compared and it was found that the epoxy groups had generally disappeared and that ether linkages had increased, thus showing that polymerization had taken place.

*Example II.—Polymerization of di-(2,3-epoxypropyl) n-butylboronate*

Ten parts of di-(2,3-epoxypropyl)-n-butylboronate and 1 part of tris(dimethylaminomethyl)phenol (DMP-30) were mixed and heated to 100° C. for 30 minutes. The resultant material was a polymer having the properties of a typical epoxy resin but which in addition was slightly elastic.

*Example III.—Polymerization of di-(9,10-epoxystearyl) n-octadecyl boronate*

To 129 parts by weight of di-(9,10-epoxystearyl)n-octadecyl boronate was added 29 parts of trimethoxyboroxine. After 17 hours at room temperature, a clear resilient polymer having adhesive properties was obtained. Heating this same composition to 120° C. for 90 minutes also yielded a clear resilient polymer.

*Example IV.—Polymerization of di-(2,3-epoxypropyl) n-octadecyl boronate*

To 205 parts of di-(2,3-epoxypropyl)n-octadecyl boronate was added 58 parts of trimethoxyboroxine in benzene. A relatively soft polymer precipitated from the benzene after 17 hours at room temperature. Heating another portion of this composition to 120° C. for 90 minutes yielded a hard white polymer.

Mixing 205 parts of the above epoxy ester and 15 parts of ethylenediamine in benzene at room temperature caused a pale yellow polymer to precipitate in 17 hours. A similar mixture yielded a hard light yellow polymer after curing for 150 minutes at 120° C.

*Example V.—Polymerization of tri-(9,10-epoxystearyl) borate*

A mixture containing 220 parts of tri-(9,10-epoxystearyl)borate and 58 parts of trimethoxyboroxine yielded a clear resilient polymer in 17 hours at room temperature.

A similar mixture was heated to 120° C. for 90 minutes and yielded a clear, tough, rubbery polymer.

*Example VI.—Polymerization of 9,10-epoxystearyl di-n-butyl borinate*

To 157 parts of 9,10-epoxystearyl di-n-butylborinate was added 29 parts of trimethoxyboroxine. After 17 hours at room temperature a very thick, viscous clear liquid was obtained. When heated to 120° C. for 90 minutes this composition yield a clear polymer having the consistency of cheddar cheese.

*Example VII.—Polymerization of epoxidized linseed borate*

An epoxy ester was produced by epoxidizing the alcohol obtained from linseed oil and esterifying boric acid with the epoxidized alcohol. A mixture of 242 parts of the ester and 58 parts trimethoxy-boroxine gelled in 60 minutes at room temperature and yielded a clear very hard solid in 17 hours. Curing a similar composition for 15 minutes at 120° C. produced a similar polymer.

*Example VIII.—Polymerization of an epoxidized soya borate*

The alcohol obtained from soybean oil was epoxidized and reacted with boric acid to produce the epoxy ester. 219 parts of this ester was treated at room temperature with 58 parts of trimethoxy-boroxine. The mix gelled in 60 minutes and formed a clear, hard but resilient polymer in 17 hours.

In another example, 219 parts of this epoxy ester and 15 parts of ethylenediamine produced a somewhat colored and viscous polymer after curing at 120° C. for 90 minutes.

In these and other tests, it has been established that epoxy esters of boron acids produce polymeric epoxy resins which have the properties normally associated with epoxy resins but having improved elastic qualities and which are resilient and tough. Such polymers are produced using any of the conventional epoxy resin curing agents, such as those discussed above, in normally-used amounts. For example, satisfactory polymers are produced from various epoxy esters of boron acids using varying types of curing agents as set forth in Table I below.

TABLE I

| Epoxy Ester | Curing Agent | Phr [1] |
|---|---|---|
| Tri-(2,3-epoxybutyl)borate | Ethylene diamine | 16 |
| Tri-(3,4-epoxyhexyl)borate | Benzyldimethylamine | 10 |
| Tri-(9,10-epoxystearyl)-borate | Hexahydrophthalic anhydride | 23 |
| Di-(2,3-epoxypropyl) nonylboronate | Diethylene triamine | 14 |
| Di-(3,4-epoxyhexyl) phenylboronate | Phthalic anhydride | 40 |
| Di-(9,10-epoxystearyl) hexylboronate | Tris (dimethylamino) phenol | 6 |
| Di-(2,3-epoxypropyl) cyclohexylboronate | Amino ethyl piperazine | 10 |
| Di-(2,3-epoxypropyl) allylboronate | Triethylamine | 10 |

[1] Parts of curing agent per hundred parts resin by weight.

Some other specific examples of esters of boron acids which produce the polymeric epoxy resins of my invention when treated with conventional curing agents in the above manner include borates such as tri-(2,3-epoxypropyl)borate, tri-(3,4-epoxyhexyl)borate, tri-(9,10-epoxystearyl)borate, tri-(3,4-epoxydodecyl)borate, tri-(5,6-epoxyheptyl)-borate, tri-(3,4-epoxy-6-methyl-heptyl)borate, tri-(9,10-epoxydecyl)borate, and tri-(11,12-epoxytetracosyl)borate. Some examples of boronates which are used include di-(2,3-epoxypropyl)n-butylboronate, di-(2,3-epoxypropyl)n-dodecyl boronate, di(2,3-epoxypropyl)benzylboronate, di-(3,4-epoxybutyl) phenylboronate, di-(9,10-epoxystearyl)o-cresyl boronate, di-(2,3-epoxy-2- ethylhexyl) butylboronate, di-(2,3-epoxypropyl) cyclohexylboronate, di-(3,4-epoxyhexyl) allylboronate, di-(11,12-epoxytriacontyl) n-butylboronate and di-(3,4-epoxy-octadecyl) nonylboronate. Other examples of boronates which produce the new polymers of this invention are those in which R in the above general formula is di(epoxyalkoxy) borylalkyl, such as 1,4-bis[di-(2,3-epoxypropoxy)boryl]butane and 1,3-bis[di-(3,4-epoxyhexoxy) boryl]hexane; those in which R is di-(epoxyalkoxy)boryl, phenyl, such as 1,3-bis-[di(3,4-epoxybutoxy)boryl]benzene and 1,4-bis[di-(5,6-epoxyhexyl)boryl]benzene; and those in which R' in the above formulas is epoxyalkyl, in which case the compounds have several epoxy groups per alkoxy group, such as those epoxy esters obtained by epoxidizing the alcohols obtained from fats and oils, e.g., linseed oil, soybean oil or tung oil.

The polymeric epoxy resins of this invention are clear, tough polymers having high adhesive strength and which are virtually inert chemically. In addition to these properties, which are found in other epoxy resins, the hardness and brittleness of those epoxy resins known heretofore are modified in the polymeric epoxy resins produced from epoxy esters of boron acids and the resins thus obtained are resilient and slightly elastic. They are particularly adapted for use in applications wherein they may be subjected to mechanical shock which would tend to shatter ordinary epoxy resins, but which my resins can withstand. Thus, for example, they can be used as protective coatings for metal parts in equipment, such as railroad cars and automobiles, which are subject to vibration in use and thus for which epoxy resins of the type known heretofore were not suitable. Moreover, the epoxy esters of boron acids when polymerized as described herein exhibit remarkably low exotherms, i.e., they produce relatively little heat during the cure, so that they are also particularly adapted for use in applications in which heat developmentd uring processing is a problem because of damage to the other elements of the finished article. Thus, for example, their properties in this respect make them valuable for use in potting and encapsulation of electronic components.

According to the provisions of the patent statutes, I have explained the principle and mode of practicing my invention and have described what I now consider to be its best embodiments. However, I desire to have it understood, that within the scope of the appended claims, the invention may be practiced otherwise than as specifically described.

I claim:
1. A solid resilient boron-containing resin produced by polymerizing through the epoxy groups at least one boron acid ester having the formula

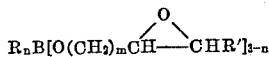

where R is a radical selected from the group consisting of alkyl containing from 1 to 18 carbon atoms, phenyl, benzyl, cyclohexyl, allyl, di-(epoxyalkoxy) boryl alkyl and di-(epoxyalkoxy) boryl phenyl, R' is a radical selected from the group consisting of hydrogen and alkyl containing from 1 to 14 carbon atoms, n is a number from 0 to 1 and m is a number from 1 to 10.

2. A solid resilient boron-containing resin produced by polymerizing at least one boron acid ester having the formula

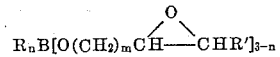

where R is a radical selected from the group consisting of alkyl containing from 1 to 18 carbon atoms, phenyl, benzyl, cyclohexyl, allyl, di-(epoxyalkoxy) boryl alkyl and di-(epoxyalkoxy) boryl phenyl, R' is a radical selected from the group consisting of hydrogen and alkyl containing from 1 to 14 carbon atoms, n is a number from 0 to 1 and m is a number from 1 to 10, and an epoxy curing agent selected from the group consisting of boroxines, amines having at least two amino hydrogens and carboxylic acid anhydrides.

3. A method of producing a boron-containing polymeric resin which comprises admixing an epoxy curing agent selected from the group consisting of carboxylic acid anhydrides, amines having at least two amino hydrogens, and boroxines and a boron acid ester having the formula

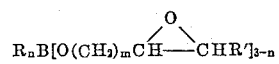

where R is a radical selected from the group consisting of alkyl containing from 1 to 18 carbon atoms, phenyl, benzyl, cyclohexyl, allyl, di-(epoxyalkoxy) boryl alkyl and di-(epoxyalkoxy) boryl phenyl, R' is a radical selected from the group consisting of hydrogen and alkyl containing from 1 to 14 carbon atoms, n is a number from 0 to 1 and m is a number from 1 to 10, at a temperature sufficient to cure said mixture to a solid.

4. A method of producing a boron-containing polymeric resin which comprises admixing a tertiary amine and a boron ester having the formula

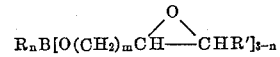

where R is a radical selected from the group consisting of alkyl containing from 1 to 18 carbon atoms, phenyl, benzyl, cyclohexyl, allyl, di-(epoxyalkoxy) boryl alkyl and di-(epoxyalkoxy) boryl phenyl, R' is a radical selected from the group consisting of hydrogen and alkyl containing from 1 to 14 carbon atoms, n is a number from 0 to 1 and m is a number from 1 to 10, at a temperature sufficient to polymerize said boron ester through the epoxy groups to a solid.

References Cited in the file of this patent
UNITED STATES PATENTS 3,030,392   4/1962   Bralley et al. _____ 260—2

OTHER REFERENCES

Paquin, "Epoxyverbindungen und Epoxydharze," Springer-Verlag, 1958, Berlin, p. 2, relied on.

WILLIAM H. SHORT, Primary Examiner.

H. N. BURNSTEIN, S. N. RICE, J. T. BROWN,
Examiners.